United States Patent

[11] 3,604,261

[72] Inventor John G. Olin
 Roseville, Minn.
[21] Appl. No. 833,434
[22] Filed June 16, 1969
[45] Patented Sept. 14, 1971
[73] Assignee Thermo Systems, Inc.
 St. Paul, Minn.

[54] MULTIDIRECTIONAL THERMAL ANEMOMETER SENSOR
 21 Claims, 14 Drawing Figs.
[52] U.S. Cl. .................................................... 73/189,
 73/204
[51] Int. Cl. .................................................... G01p 13/00
[50] Field of Search ........................................ 73/189, 204

[56] References Cited
UNITED STATES PATENTS
3,352,154 11/1967 Djorup .......................... 73/189
3,359,794 12/1967 Rosenberg ..................... 73/189
3,498,127 3/1970 Richards ....................... 73/204

*Primary Examiner*—Jerry W. Myracle
*Attorney*—Burd, Braddock and Bartz

ABSTRACT: A multidirectional thermal anemometer device to sense the speed and direction of a fluid velocity vector by making qualitative and/or quantitative use of the asymmetry or nonuniformity of the heat flux distribution around a constant-temperature thermal anemometer sensor. The sensor has segmented heat sensing films covering the entire surface of the sensing body. The entire surface of the sensing body is heated with one or more constant-temperature anemometer electronic control systems electrically coupled to each segment of the film. The electrical outputs of the control systems are operated on by either a digital or analog computer to yield quantitative information about the magnitude and direction of the fluid velocity vector.

PATENTED SEP 14 1971
3,604,261
SHEET 1 OF 3
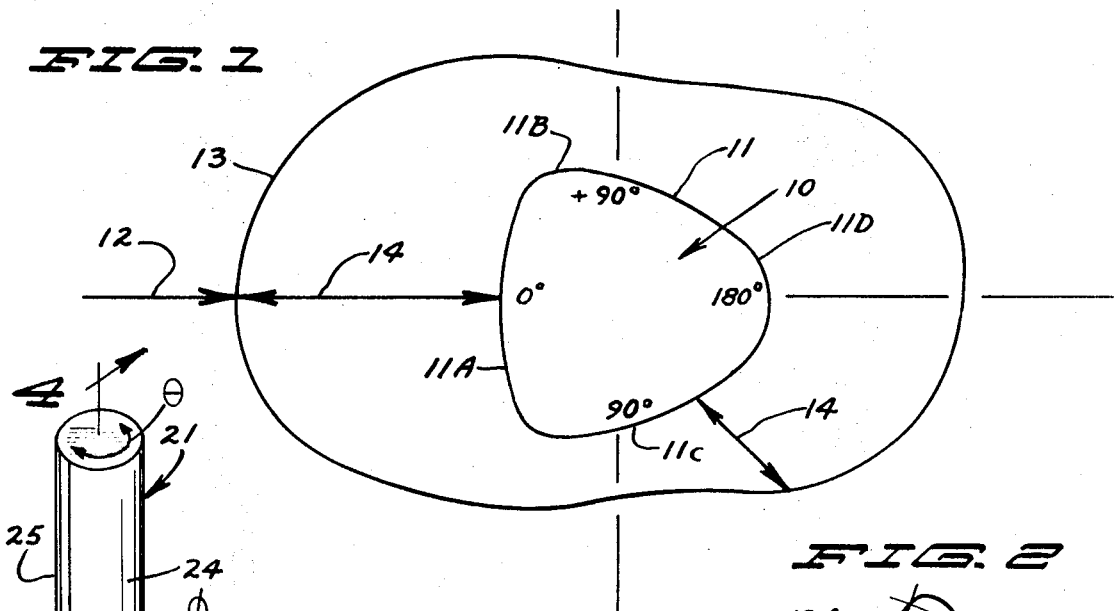
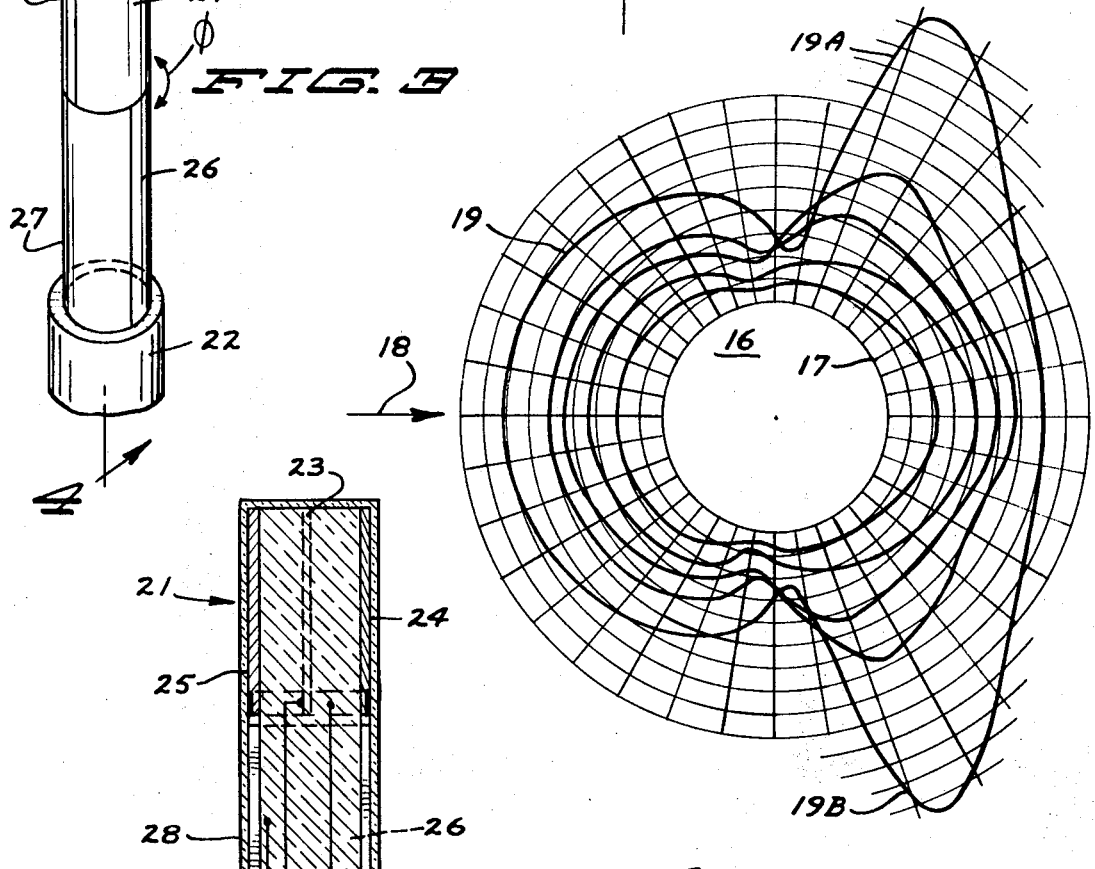
INVENTOR.
JOHN GEORGE OLIN
BY
Burd Braddock & Bartz
ATTORNEYS

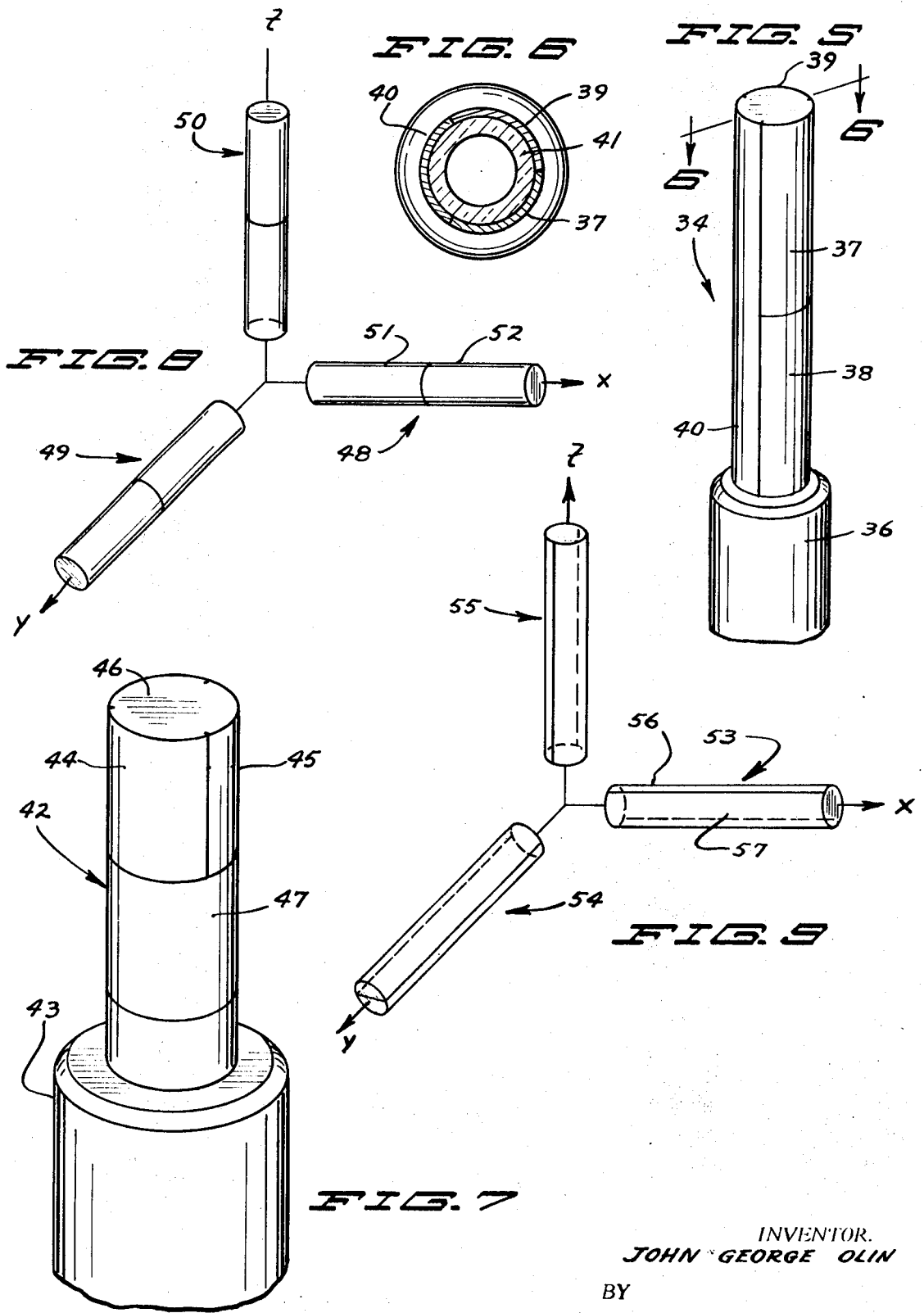

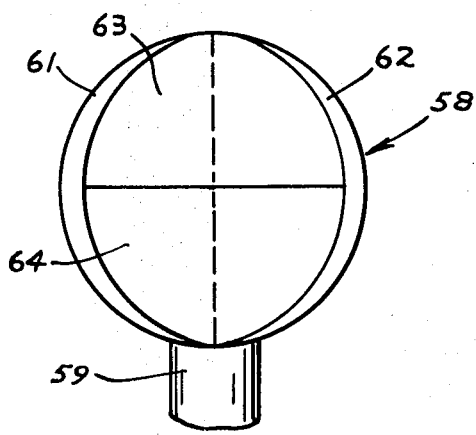
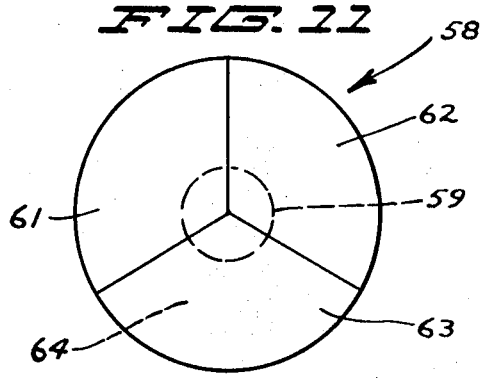
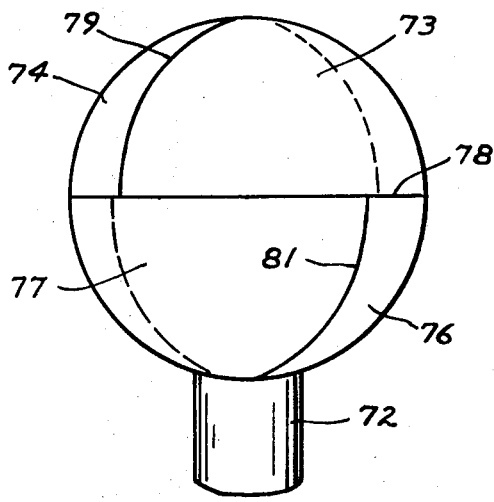
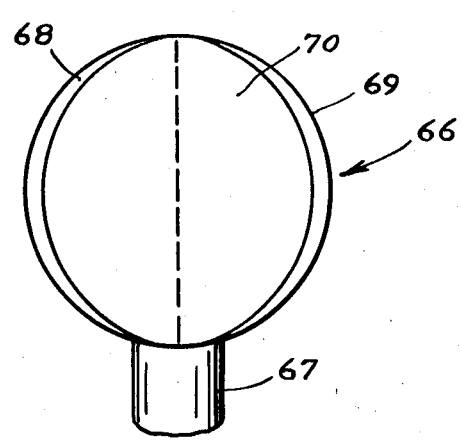
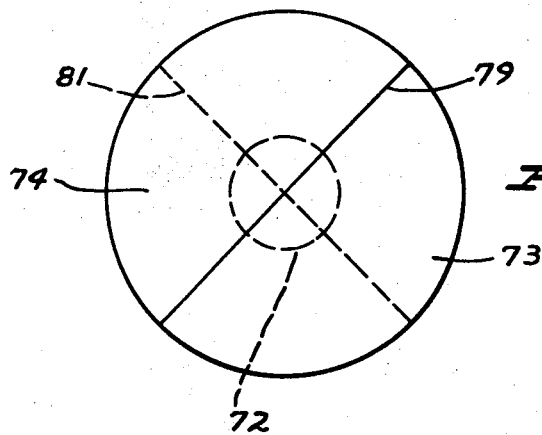
INVENTOR.
JOHN GEORGE OLIN

MULTIDIRECTIONAL THERMAL ANEMOMETER SENSOR

BACKGROUND OF INVENTION

Studies of fluid flow thermodynamics show that there is a variation in the heat transfer coefficient around a body dependent on the velocity of the fluid medium flowing past the body. FIGS. 1 and 2 of the drawing show the distribution of the heat-transfer flux around the outer surfaces of bodies. The major portion of the heat transfer occurs on the front side of the body and on the back side in the wake. At low Reynolds numbers, the heat transfer on the front side is much greater than on the backside. With an increasing Reynolds number, the heat flow from the backside increases at a greater rate than on the front side. The reason for this is that the vortices, while separating alternately from the right and left flank of the body, wash the surface of the rear half of the body with an intensity that increases with the Reynolds number. When the boundary layer of the medium changes to turbulent flow, it separate from opposite sides of the surface of the body increasing the eat transfer coefficient. As shown in FIG. 2, this occurs at port and starboard angles of about 100° relative to the direction of flow of the medium. At this point, the heat transfer increases appreciably where the laminar boundary layer changes to turbulent flow.

Sensing instruments have hot wire or hot-film sensors have been developed for measuring fluid flow parameters, as velocity, mass flow, turbulence, pressure, and temperature, and by sensing the heat transfer rate between an electrically heated element and the flow medium. These instruments are useful for measuring the velocity vector in a single octant. The response of the sensor to the fluid flow is sensed by a constant temperature anemometer circuit. This type of circuit measures instantaneous heat transfer rate between the heated element of the sensor and the fluid medium being measured. Examples of this type of instrumentation are shown in U.S. Pat. No. 3,138,025 and U.S. Pat. No. 3,333,470. These instruments utilize a constant temperature anemometer circuit having a bridge circuit in which the heated sensor is controlled at a constant resistance and, therefore, at a constant temperature. An amplifier senses any change in bridge balance due to flow changes in electrical current through the bridge to control the sensor. The heated sensor measures the instantaneous heat transfer rate between the sensor and the fluid being measured. The heat transfer rate is a function of the flow of fluid over the sensor as well as the temperature of the fluid. The temperature effect is compensated for by using an additional sensor that measures temperature and corrects the anemometer output. This system, with proper calibration, measures fluid velocity when the sensor is exposed perpendicular to the mean velocity. Accordingly, its effective use depends on a previous knowledge of the direction of the mean velocity.

Techniques have been devised which measure the instantaneous velocity when the octant of the velocity vector in the 360° solid angle is known, as in wind tunnels and pipes. These techniques are not applicable in situations where the direction of the velocity vector in the flowing fluid is not known. Such situations occur in meteorology and in other outdoor flow conditions, in the inlet regions of jet engines, near the blades of aircraft and helicopter propellers, in the wakes of aircraft, and other objects in a flow medium.

SUMMARY OF INVENTION

The invention embodies the structure and method of using the heat flux distribution around a sensing element having a plurality of sensing segments to provide accurate measurements of the instantaneous velocity vector in both magnitude and direction in three-dimensional flow fields. The segmented sensor is operable to sense the local heat flux at a plurality of points about the sensor to provide information correlated to the heat transfer at the particular local ares of the segment. The sensing device can be used on each of the three sensors of a three-directional device. The three directional device is ideal for fast-response measurements of (1) meteorological flows and turbulence, (2) three dimensional wakes in jets, (3) flow near the blades of helicopters and other aircraft, (4) flow near the inlet of jet engines on aircraft, (5) flow around objects in the earth's boundary layer, as ships, buildings, and plants, and (6) other three-dimensional flows. IN THE DRAWINGS:

FIG. 1 is a diagrammatic view of the heat flux distribution around a general body with a constant temperature surface submersed in a moving fluid;

FIG. 2 is a diagrammatic view of the heat flux distribution around a constant temperature cylinder with the velocity of the fluid flowing normal to the axis of the cylinder;

FIG. 3 is a perspective view of a cylindrical multidirectional sensor of the invention;

FIG. 4 is an enlarged longitudinal sectional view of the sensor of FIG. 3;

FIG. 5 is a perspective view of another cylindrical sensor having longitudinally separated sensing segments;

FIG. 6 is a cross-sectional view taken along the line 6—6 of FIG. 5;

FIG. 7 is a perspective view of yet another cylindrical sensor having longitudinally and transverse segments;

FIG. 8 is an array of three normally disposed cylindrical sensors having transversally spaced cylindrical segments;

FIG. 9 is a view similar to FIG. 8 showing an array of three normally disposed longitudinally split film cylindrical sensors;

FIG. 10 is a side view of a spherical sensor having a segmented sensing surface;

FIG. 11 is a plan view of the sensor of FIG. 10;

FIG. 12 is a view of another spherical sensor having a segmented sensing surface.

FIG. 13 is a view of yet another spherical sensor with four equal segments; and

FIG. 14 is a top plan view of FIG. 13.

Referring to the drawings, there is shown in FIG. 1 a body 10 having an outer surface 11 exposed to fluid, as air, moving in the direction of arrow 12. The fluid is directed to the front face 11A of the body and flows past the opposite sides 11B and 11C and away from the back 11D. When the surface 11 is operated at a constant temperature different from that of the fluid, a nonuniform heat flux distribution, shown as a heat flux boundary line 13, surrounds the body 10. The amount of heat transferred from the body 10 to the moving fluid is indicated by the distance 14 that the boundary line 13 is from the body surface 11. The amount of heat transferred from various portions of the surface 11 varies with the velocity and the direction of flow of the fluid.

FIG. 2 shown a uniform diameter body 16, as a cylinder or sphere, having a uniformly curved heat transfer surface 17 subject to fluid moving in the direction of the arrow 18 normal to the body. The surface 17 is superimposed on polar coordinates with the direction of movement of the fluid being the reference or zero angle. The heat transfer from various sections of the surface 17 varies with the dimensionless parameter of fluid flow known as the Reynolds number. At low Reynolds numbers, the heat transfer on the front side is much greater than on the backside. With increasing Reynolds number, the heat flow from the back side increases at a greater rate than on the front. For a Reynolds number of approximately 50,000 for a cylindrical body, the heat transfer rate on the front side is essentially equal to the heat transfer on the back side.

The fluid flowing around the body washes the surface 17 of the rear half of the body with an intensity that increases with the Reynolds number. When the boundary layer or fluid layer adjacent the surface changes to turbulent flow, it separates from the surface 17 with the result that the distribution of the heat transfer flux along the surface changes. At higher Reynolds numbers, the heat transfer coefficient has a marked increase approximately at both the right and left 100° angles shown by 19A and 19B. This indicates transition in the flow within the boundary layer. By sensing the heat transfer at various portions or segments of the surface 17, information or data can be obtained so that the direction as well as the magnitude of the flow of fluid can be determinded.

Referring to FIGS. 3 and 4, there is shown a cylindrical sensor 21 mounted on and projected upwardly from a support 22. Sensor 21 has a cylindrical core 23 consisting of either a rod or tube of quartz or similar material carrying a plurality of segments 24-27 of thin electrically conductive film, as segmented platinum. The sensor can also be supported at each end. Approximately one-half of the outer surface of the core 23 is covered with a pair of segments 24 and 25 circumferentially separated from the second pair of segments 26 and 27 around the midportion of the core. The adjacent segments are separated from each other with small axial spaces or axial splits. The axial splits extend generally parallel to the longitudinal axis of the core 23. Preferably, one-quarter to 1 mil spaces separate the adjacent segments. The axial splits between the segments 24 and 25 are circumferentially spaced 90° relative to the axial splits between the segments 26 and 27. The four segments 24-27 cover the entire outer surface of the core 23. The entire sensor can be coated with a cover layer 28 of quartz or similar nonconductive material. All of the sensing film segments are maintained at a constant surface temperature with separate electrical power units 29, 30, 31, and 32, connected with lines, as copper wire leads, schematically shown as 33, to the segments 24 and 27 respectively. Gold plated strips can be used to electrically connect the lines 33 to the segments. The units 29 to 32 comprise constant-temperature anemometer control systems for each of the segments. The control systems are operative to control all of the segments at a constant temperature. That is, all segments are controlled to operate at the same constant average temperature. The constant-temperature anemometer control system can be separate for each segment. Alternatively, certain components of the control system can be shared by two or more segments to reduce the amount of required attendant electronics. An example of a DC constant anemometer control circuit is shown in U.S. Pat. No. 3,138,025 and U.S. Pat. No. 3,333,470. This instrumentation utilizes a constant-temperature anemometer circuit having a bridge circuit in which the heat sensor is controlled at a constant resistance and, therefore, at a constant temperature. The sensor is heated by current from a high gain DC amplifier. The amplifier senses any change in bridge balance due to flow changes and changes an electrical current through the bridge to control the sensor. As fluid flow increases, the sensor tends to cool causing an off-balance of the bridge. This off-balance is immediately sensed by the amplifier which feeds back more current to bring the bridge back into balance. The heated sensor measures the instantaneous heat transfer rate between the sensor and the fluid being measured. Any constant-temperature anemometer control circuit can be used for this application.

The outputs of the control circuits for the separate segments are operated on in a digital or analog computer to give quantitative information about the direction and magnitude of the three-dimensional velocity vector of the flowing medium. For example, (1) the ratios of the heat fluxes to segments 24 and 25 and 26 and 27 shown in FIG. 3, namely, $q_2/q_1$ and $q_4/q_3$, can quantitatively determine the angle $\theta$ of the fluid velocity vector, (2) the heat-flux ratio $$\frac{q_1+q_2}{q_3+q_4}$$

can quantitatively determine the angle $\Phi$ of the fluid velocity vector (with $\theta$ and $\Phi$ determined, the direction of the three-dimensional fluid velocity vector is determined), and (3) the sum of heat fluxes $q_1 + q_2$ can quantitatively determine the magnitude of the fluid velocity vector.

Referring to FIGS. 5 and 6, there is shown a modified cylindrical sensor, indicated generally at 34, mounted on a support 36. Sensor 34 has a plurality of spaced sensing segments 37, 38, 39, and 40 of thin electrically conductive film, as segmented platinum, covering the entire outer surface of the sensor. As shown in FIG. 6, the segments are attached to the outer surface of a tubular core 41. The core may be a rod or tube of nonconductive material, as quartz or similar material. Approximately one-third of the outer surface of the core 41 is covered with a pair of segments 37 and 38 circumferentially separated from each other along the midportion of the core 41. Located adjacent opposite sides of segments 37 and 38 are longitudinal segments 39 and 40. The segments 39 and 40 have substantially equal areas with each area covering approximately one-third of the outer surface of the core 41. The entire sensor can be coated with a cover layer of quartz or similar nonconductive material. All of the sensing film segments are maintained at a constant surface temperature with constant-temperature anemometer control systems, as described above.

Referring to FIG. 7, there is shown a further cylindrical sensor, indicated generally at 42, projected upwardly and mounted on a support 43. The sensor has three sensing segments 44, 45, and 46 covering the entire outer surface of approximately one-half of the core and a fourth sensing segment 47 covering the remaining one-half of the core. The segments 44, 45, and 46 are axially separated from each other. Each segment 44, 45, and 46 covers approximately one-third of the area of the upper half of the core. Segment 47 is circumferentially separated from the segments 43, 44, and 45 around the midsection of the core and covers the entire surface of the lower half of the core. Four constant-temperature anemometer control circuits, operatively connected to the segments 44, 45, 46, and 47, are used for complete 360° solid angle sensing.

Referring to FIG. 8, there is shown an array of cylindrical sensors 48, 49, and 50 normally disposed relative to each other along the X, Y, and Z axis of a support. These three sensors can either have single-ended supports or can be supported at each end. Each sensor has a central azimuthal split separating a pair of cylindrical film segments 51 and 52 whereby the array has six separate sensing film segments. The axial skew in the temperature is sensed to provide information as to the direction and the magnitude of the velocity of the moving fluid. The details of the structure and sensing systems are shown and described in copending U.S. application Ser. No. 798,756 filed Feb. 12, 1969.

FIG. 9 shows a similar array of three cylindrical sensors 53, 54, and 55 normally disposed relative to each other along the X, Y, and Z axis of a support. Each sensor has axially split films 56 and 57. The quantitative information for each of the three axially split sensors gives the octants of the velocity vector. The sum of the powers for the two splits for each of the three cylindrical sensors in the array gives the magnitude and direction of the three-dimensional velocity vector in the determined octant.

FIGS. 10 and 11 show a spherical sensor 58 mounted on a support 59. Sensor 58 has a spherical outer surface covered with a plurality of film segments 61, 62, 63, and 64. The segments are heat sensing films similar to the films on the sensor 21. The sensors are separated from each other along vertical planes and cover approximately one-third of the surface area of the sphere. Sensors 63 and 64 are separated along the equator whereby one-third of the surface of the sensor is covered with segments 63 and 64. This sensor is capable of giving complete three-dimensional velocity vector indication.

Referring to FIG. 12, there is shown a modification of the spherical sensor, indicated generally at 66, mounted on an upright support 67. Sensor 66 has heat sensitive film segments covering the entire outer surface and separated into three substantially equal segments 68, 69, and 70. The segments are separated along vertical planes located approximately 120° from each other. This sensor is capable of giving unique velocity vector indication in a 180° solid angle, not in the complete 360° solid angle.

Referring to FIGS. 13 and 14, there is shown a further modification of a spherical sensor, indicated generally at 71, mounted on an upright support 72. The sensor has a core member with a spherical outer surface covered with separate segments 73, 74, 76, and 77 of electrically conductive sensing material. Each segment is electrically coupled to means operative to sense the rate of heat transfer from each segment to the surrounding fluid medium. This means can comprise a constant-temperature anemometer control system hereinbefore described. The heat sensitive film comprises a first pair of segments 73 and 74 covering approximately one-half of the spherical surface and a second pair of segments 76 and 77 covering the remaining one-half of the surface. The pairs of segments 73, 74, and 76, 77 are separated from each other on a circumferential mid or equator line 78. The first pair of segments 73 and 74 are separated from each other along a longitudinal line 79 which passes through the pole of the sphere whereby the segments 73 and 74 are substantially equal in area approximating one-quarter of the spherical surface of the sphere. The second pair of segments 76 and 77 are separated from each other along a longitudinal line 81 which passes through the opposite pole whereby the segments 74 and 77 have substantially equal areas approximating one-quarter of the surface of the sphere. As shown in FIG. 14, the longitudinal lines 79 and 81 are located in planes that are normally disposed with respect to each other whereby the lines 79 and 81 are 90° from each other circumferentially along the equator line 78.

While there have been shown and described the preferred embodiments of the invention, it is understood that various changes, omissions, and substitutions may be made by those skilled in the art. All of the sensors may be coated with the nonconductive material, as quartz and like materials. The spherical sensors may be supported in an array of three sensors, as shown in FIGS. 8 and 9. The segmental areas of the separate sensing films may vary in size, location, and configuration.

I claim:

1. A fluid properties sensor comprising: a solid core member having a cylindrical outer surface, separate segments of electrically conductive sensing material covering substantially the entire outer surface of the core member, said segments being axially separated from each other, electrical power means electrically coupled to each segment to maintain the segments at substantially constant temperature, and sensing means electrically coupled to each segment to sense rate of heat transfer from each segment to the surrounding fluid.

2. The sensor of claim 1 wherein: the segments are electrically conductive films.

3. The sensor of claim 2 wherein: at least two segments are circumferentially separated from each other.

4. The sensor of claim 3 including: a coating of nonconductive material covering the segments.

5. The sensor of claim 1 wherein: the sensing means is a constant-temperature anemometer control system.

6. A fluid properties sensor comprising: a solid core member having an elongated outer surface, a plurality of spaced electrically conductive films covering substantially the entire outer surface of the core member, axially separated adjacent films, electrical power means electrically coupled to each film to maintain the film at substantially constant temperature, and sensing means electrically coupled to each film to sense rate of heat transfer from each film to the surrounding fluid.

7. The sensor of claim 6 wherein: at least two films are circumferentially separated from each other.

8. The sensor of claim 6 wherein: the sensing means is a constant-temperature anemometer control system.

9. The sensor of claim 6 including: a coating of nonconductive material covering the films.

10. An array of three fluid properties sensors normally supported relative to each other along X, Y, and Z axes, each of said sensors having a core member having an outer surface, separate segments of electrically conductive sensing material covering substantially the entire outer surface of the core member, electrical power means electrically coupled to each segment to maintain the segments at substantially constant temperature, and sensing means electrically coupled to each segment to sense rate of heat transfer from each segment to the surrounding fluid.

11. The sensor of claim 10 wherein: the core member has a cylindrical outer surface and the segments are axially separated from each other.

12. The sensor of claim 10 wherein: the core member has a cylindrical outer surface and the segments are circumferentially spaced from each other.

13. The sensor of claim 10 wherein: the core member has an elongated cylindrical outer surface, said segments comprising a plurality of spaced electrically conductive films covering substantially the entire surface of the core member.

14. A fluid properties sensor comprising: a core member having an outer surface, separate segments of electrically conductive sensing material substantially covering the entire outer surface of the core member, said segments covering said outer surface comprising a first pair of segments longitudinally spaced from each other and a second pair of segments longitudinally spaced from each other, said first pair of segments being circumferentially separated from the second pair of segments, electrical power means electrically coupled to each segment to maintain the segments of substantially constant temperature, and sensing means electrically coupled to each segment to sense rate of heat transfer from each segment to the surrounding fluid.

15. The sensor of claim 14 wherein: the longitudinal spaces between the first pair of segments are circumferentially spaced approximately 90° from the longitudinal spaces between the second pair of segments.

16. The sensor of claim 14 including: a coating of nonconductive material covering the segments.

17. A fluid properties sensor comprising: a core member having a cylindrical outer surface, separate segments of electrically conductive sensing material covering substantially the entire outer surface of the core member, said segments comprising three substantially equal segments covering about one-half of said surface and one segment covering the remainder of said surface, electrical power means electrically coupled to each segment to maintain the segments at substantially constant temperature, and sensing means electrically coupled to each segment to sense rate of heat transfer to the surrounding fluid.

18. The sensor of claim 17 wherein: the three segments are longitudinally spaced from each other and circumferentially spaced from the one segment.

19. A fluid properties sensor comprising: a core member having a spherical outer surface, separate segments of electrically conductive sensing material covering substantially the entire outer surface of the core member, said segments comprising a first pair of segments longitudinally separated from each other, and a second pair of segments longitudinally separated from each other, the first pair of segments being circumferentially spaced from the second pair of segments, the longitudinal spaces between the first pair of segments being circumferentially spaced approximately 90° from the longitudinal space between the second pair of segments, electrical power means electrically coupled to each segment to maintain the segments of substantially constant temperature, and sensing means electrically coupled to each segment to sense rate of heat transfer from each segment to the surrounding fluid.

20. An array of a plurality of fluid properties sensors normally supported relative to each other normally disposes axes, each of said sensors having a core member having an outer surface and separate segments of electrically conductive sensing material covering substantially the entire outer surface of the core member, electrical power means electrically coupled to each segment to maintain the segments at substantially constant temperature, and sensing means electrically coupled to each segment to sense rate of heat transfer from each segment to the surrounding fluid.

21. The sensor of claim 20 wherein: core member of each sensor has an elongated cylindrical outer surface, said segments comprising a plurality of spaced electrically conductive films covering substantially the entire outer surface of the core member